(12) United States Patent
Hofleitner et al.

(10) Patent No.: US 9,787,781 B2
(45) Date of Patent: Oct. 10, 2017

(54) ESTIMATION OF USER LOCATION BASED UPON ACCESS PATTERNS

(71) Applicant: FACEBOOK, INC., Menlo Park, CA (US)

(72) Inventors: Aude Hofleitner, San Francisco, CA (US); Zoe Abrams Bayen, Mountain View, CA (US)

(73) Assignee: FACEBOOK, INC., Menlo Park, CA (US)

( * ) Notice: Subject to any disclaimer, the term of this patent is extended or adjusted under 35 U.S.C. 154(b) by 156 days.

(21) Appl. No.: 13/769,193

(22) Filed: Feb. 15, 2013

(65) Prior Publication Data

US 2014/0237105 A1 Aug. 21, 2014

(51) Int. Cl.
*H04L 29/08* (2006.01)
*H04L 12/24* (2006.01)

(52) U.S. Cl.
CPC ............ *H04L 67/18* (2013.01); *H04L 67/22* (2013.01); *H04L 41/147* (2013.01)

(58) Field of Classification Search
CPC ............ H04L 43/0876; G06Q 30/0261; G06Q 30/0277
USPC ........................................................ 370/230
See application file for complete search history.

(56) References Cited

U.S. PATENT DOCUMENTS

| | | | | |
|---|---|---|---|---|
| 8,914,500 | B1 * | 12/2014 | Liu | G06Q 30/0269 709/223 |
| 2003/0023715 | A1 * | 1/2003 | Reiner | G06F 11/32 709/224 |
| 2003/0083938 | A1 * | 5/2003 | Smith | G06Q 30/02 705/14.53 |
| 2005/0188222 | A1 * | 8/2005 | Motsinger | G06F 21/316 726/5 |
| 2005/0216336 | A1 * | 9/2005 | Roberts et al. | 705/14 |
| 2006/0146707 | A1 * | 7/2006 | Brethereau et al. | 370/230 |
| 2009/0019182 | A1 * | 1/2009 | Riise et al. | 709/245 |

* cited by examiner

*Primary Examiner* — Alina N Boutah
*Assistant Examiner* — Albert Chiou
(74) *Attorney, Agent, or Firm* — Nicholson De Vos Webster & Elliott LLP

(57) ABSTRACT

Exemplary methods, apparatuses, and systems store an identifier for a user device when the user device is determined to be accessing a network service and store a time at which the user device is determined to be accessing the network service for each instance of the user device being determined to be accessing the network service. Periods of time during each day of the week in which the user device is likely to accessing to the network service are determined based upon the stored identifier and times. Whether the user is likely to access the network service while at work or at home is determined based upon the determined periods of time in which user devices are likely to be accessing the network service.

15 Claims, 6 Drawing Sheets

… (1) …

ESTIMATION OF USER LOCATION BASED UPON ACCESS PATTERNS

FIELD

The various embodiments described herein relate to estimating the location or context in which users of an online service will access the online service. In particular, the embodiments relate to the utilization of a social networking platform to determine the likelihood that a user will use access the social network while at work, while at home, during a commute, or within another context based upon user access patterns.

BACKGROUND

A social networking system allows users to designate other users or entities as connections (or otherwise connect to, or form relationships with, other users or entities), contribute and interact with their connections, use applications, join groups, list and confirm attendance at events, invite connections, and perform other tasks that facilitate social interaction. External applications also use the services of a social networking system to allow authenticated users to incorporate some of the above social interactions with use of the external applications.

SUMMARY OF THE DESCRIPTION

Exemplary methods, apparatuses, and systems store a time for each instance a network identifier for a user device is determined to be accessing a network service, such as a social networking platform. Periods of time during a given day in which the user device is likely to be accessing the network service are determined based upon the stored network identifier and times. Whether the user is likely to access the network service while at work or at home is determined based upon the determined periods of time in which the user is likely to be accessing the network service using a network identifier. In one embodiment, such an estimation of user access patterns from work and home are applied to clusters of users.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein estimate when users of a network service, such as a social networking platform, are likely to access the network service from home, from work, during a commute, or within another context. Using this estimation, the network service is able to optimize targeted advertising, bandwidth allocation, download quality, request priority, mobile application software, etc.

Figure 1:
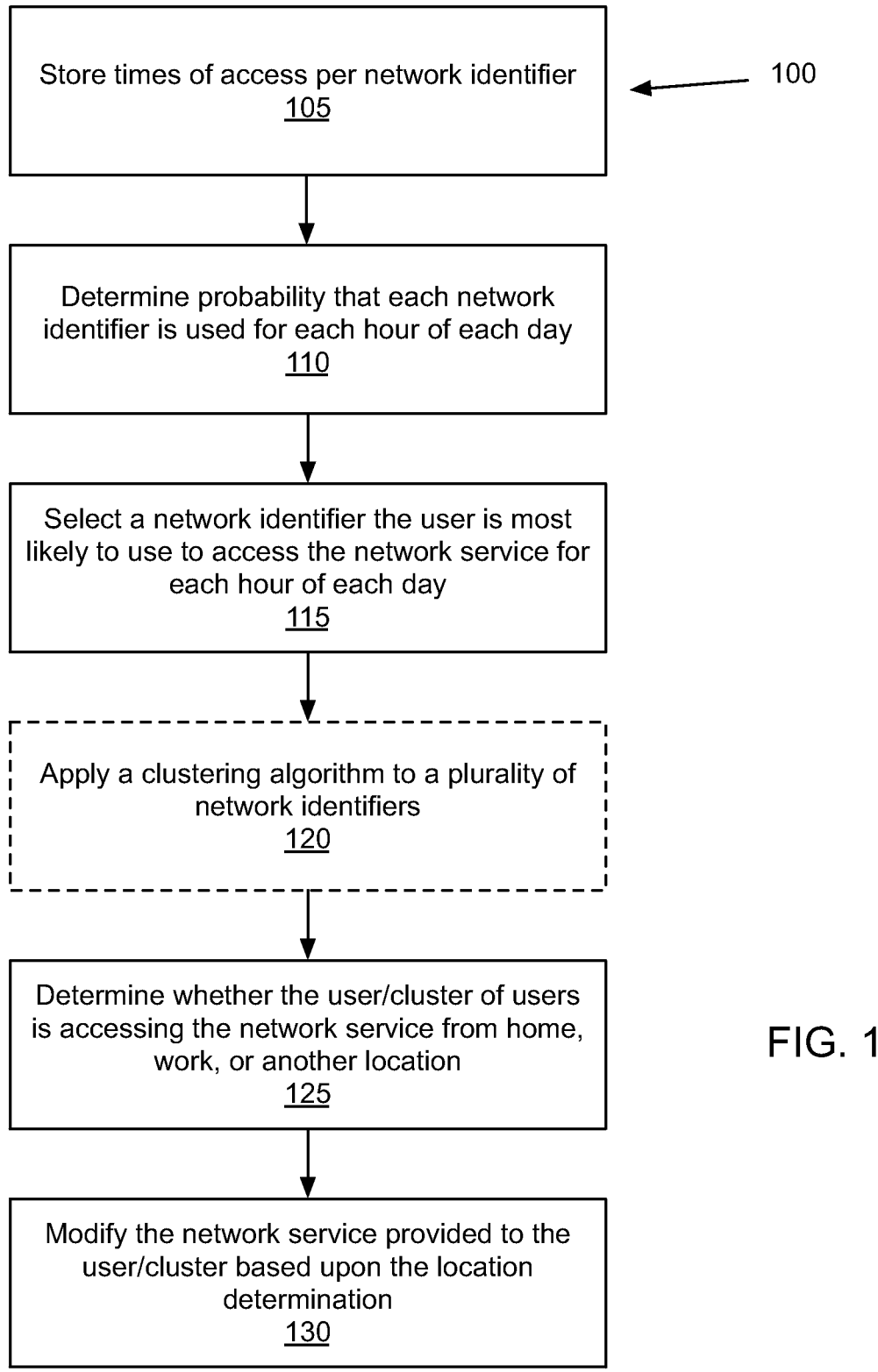
FIG. 1 is a flow chart illustrating an exemplary method of determining whether a user or cluster of users is accessing a social network from home or from work.

FIG. 1 is a flow chart illustrating an exemplary method 100 of determining whether a user, or a cluster of users, is accessing a network service from home or from work. The method 100 may be performed entirely at the network service (e.g., social networking system 510 described below), or certain aspects may be performed at the network service while other aspects are performed at a different entity (e.g., external server 515 described below). Throughout the following description, one or more aspects of the method 100 is described as being performed by a system. As used herein, the system refers to the network service, other entity, or a combination thereof. Additionally, the following examples are described with reference to a social network or social networking system. The embodiments described herein, however, apply to other network services that identify individual users.

At block 105, a system stores times at which a user is determined to be accessing, coupled to, or logged in with the network service using a network identifier. In one embodiment, the network identifier is an Internet Protocol (IP) address or a portion of an IP address assigned to the user's device while accessing the network service. Alternatively, the network identifier is a Media Access Control (MAC) address or another network/device identifier. For example, the system stores a count of activity per IP address, user, and hour and day of the week. Exemplary activity includes the user logging in on the network service, sending web requests, transmitting/receiving data to/from the network service, etc. Times of access may be measured in varying levels of granularity, including seconds, minutes, hours, days, weeks, months, and years.

In one embodiment, the system further stores times at which the user does not access the network service. For example, the system may utilize an identifier in place of the typical network identifier as an indication of no access.

Figure 2:
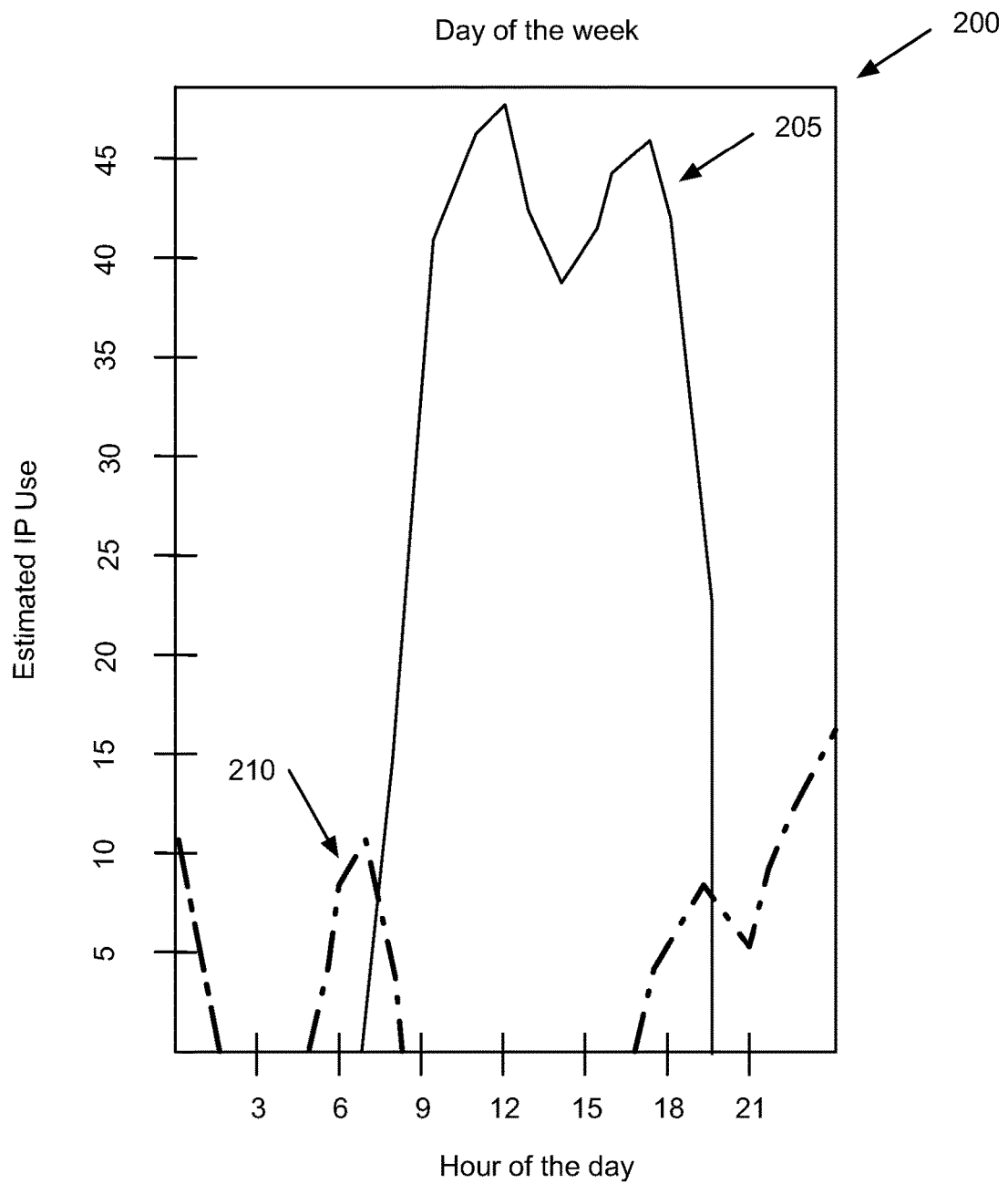
FIG. 2 is a chart illustrating an estimated amount a user accesses the social network throughout the day using one or more network identifiers.

FIG. 2 is a chart 200 illustrating an estimated amount a particular user accesses the social network throughout the day using multiple network identifiers. The chart 200 represents a number of web requests (or other user activity) detected and stored for each IP address associated with a user during each hour of the day. For example, user activity on a first IP address 205 begins around 7 am, peaks at above 45 web requests around 12 pm, and drops off between 6 and 8 pm. A second IP address 210 shows less activity, which occurs between 12 am and 2 am, 5 am and 8 am, and from 5 pm throughout the remainder of the night.

While FIG. 2 illustrates a single day for the user, the system stores access data for the user for each day of the week. In one embodiment, the system stores access data up to a threshold, e.g., up to a predetermined number of weeks.

Referring back to FIG. 1, at block 110, the system determines the probability that the user will access the network service using one more network identifiers for predefined periods of time based upon the stored user activity. For example, the system determines the probability that the user will access the network service for each hour of each day of the week for each network identifier associated with the user. In one embodiment, the system reaches a threshold of stored activity data to be used in determining the probability of future user access. For example, the system may use a multiple of a number of weeks in determining said probability.

In one embodiment, determining the probability of user access for each hour of each day includes the system adjusting the stored values for activity to reduce drastic fluctuations or otherwise attempting to fill gaps in data and/or smooth the curves of the user's access (e.g., chart 200) based upon related activity during other periods of time (e.g., using data normalization or a similar method). In one embodiment, the system adjusts the stored values using Gaussian smoothing. Alternatively, U.S. patent application Ser. No. 13/544,698, the contents of which are hereby incorporated by reference in their entirety, describes the determination of a confidence score for an unknown connection between nodes of a graph based upon similarity between related nodes. In one embodiment, the process described in U.S. patent application Ser. No. 13/544,698 is used to fill in gaps and smooth the curves of the chart 200 and determine the probability of user activity per network identifier and time period. In such an embodiment, in the terminology used in U.S. patent application Ser. No. 13/544,698, the nodes represent time periods and network identifiers (including an identifier for when the user is not accessing the network service), the edges between time period nodes indicate the similarity between respective time periods, and the edges between time period nodes and network identifier nodes indicate the stored activity values during the respective time periods. Exemplary measures of similarity between respective first and second nodes representing time periods are based upon the distance in time between nodes within the day of the first time period (e.g., 1 pm on a Monday is more similar to 2 pm on that Monday than 4 pm on that Monday) and/or based upon the distance in time between nodes between similar days (e.g., 1 pm on a Monday is more similar to 2 pm on Monday or 1 pm on Tuesday than 4 pm on Friday or 8 am on Saturday). With the inputs described above, a matrix computation is performed to determine the probability that a user will access the network service using a given IP address or no IP address during a period of time.

Figure 3:
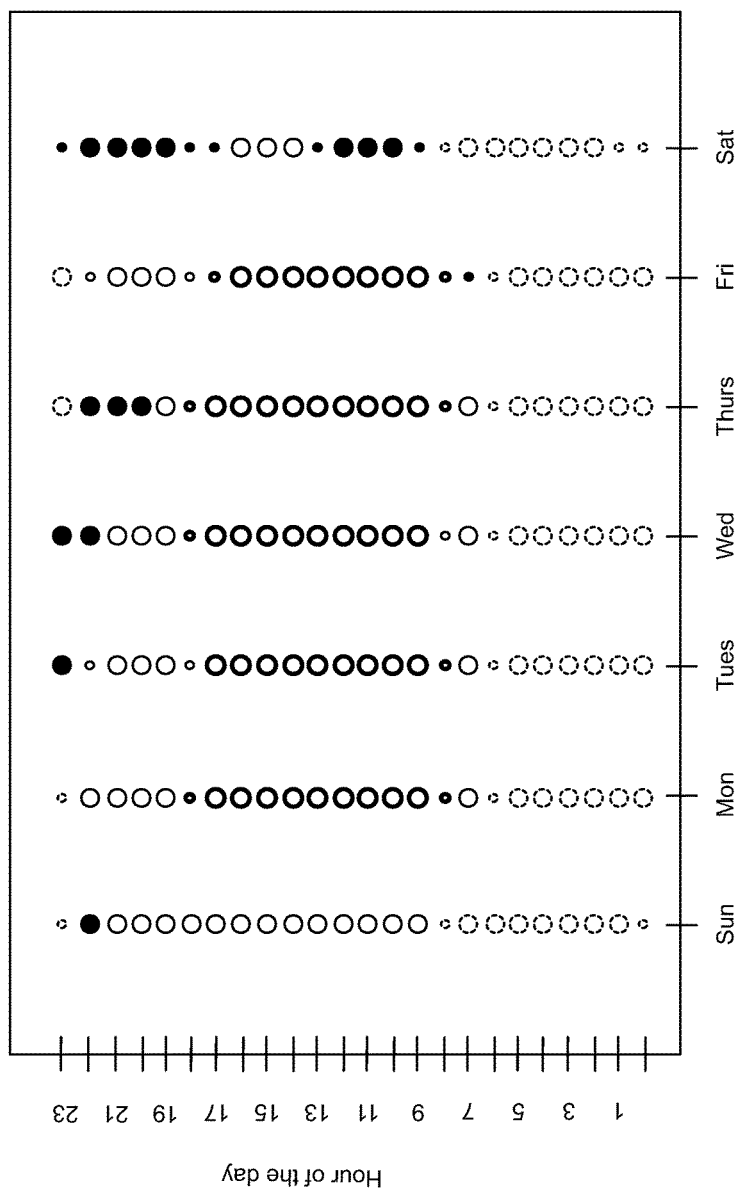
FIG. 3 illustrates an estimated probability of the user accessing the network using one or more network identifiers throughout each day of the week.

FIG. 3 illustrates the estimated probability of the user accessing the network using one or more network identifiers throughout each day of the week, e.g., said estimated probability determined as described above. Four different network identifiers are represented in FIG. 3: 1) a broken line circle representing no access, 2) a thin solid line circle representing a first IP address, 3) a thick solid line representing a second IP address, and 4) a filled circle representing a third IP address. Larger circles represent a greater probability of use/estimated amount of use. Smaller represent a lesser probability of use/estimated amount of use. FIG. 3 includes a circle for each hour of each day of the week. Fewer or more circles may be used to represent larger or smaller periods of time, respectively. Additionally, fewer or more network identifiers may be included based upon a particular user's access to the network service.

Referring back to FIG. 1, at block 115, the system selects a network identifier the user is most likely to use to access the network service for each time period. For example, as illustrated in FIG. 2, the stored user activity may include periods of time in which the user accesses the network service using more than one IP address (e.g., between 7 am and 8 am and between 4 pm and 8 pm). In such an instance, for each period of time, the system selects the network identifier with the greatest probability of access or amount of activity estimated for that period. As illustrated in FIG. 3, each time period of each day is associated only with a single network identifier.

At block 120, the method 100 optionally includes applying a clustering algorithm to network identifiers for a plurality of users. For example, a k-means algorithm applied to the estimated network access probabilities for each time slot for each network identifier will find clusters of user network identifiers that are likely to access the network service during the time periods of a week. Clusters of users with similar access patterns provide insight to market segments. In one embodiment, based upon and in response to said insight of market segment access patterns, the network service adjusts its service (bandwidth, advertising, etc.) for individuals within a cluster or for an entire cluster.

In one embodiment, the clustering algorithm is separately applied to different groups of users. For example, the network identifiers are separated by type of connection used for each IP address. Exemplary connection types include broadband, cable, mobile (e.g., 2G, 3G, 4G), digital subscriber line (DSL), etc. In one embodiment, the IP addresses are separated into groups for no connection, mobile connection, and the remainder are separated into what is collectively referred to herein as a desktop connection. A portion of each IP address indicates whether the IP address is associated with a mobile connection or a desktop connection. Additional groupings may be used, including groups based upon geographic location, type of device, data about the users (e.g., age, gender, affiliation), etc.

Figure 4:
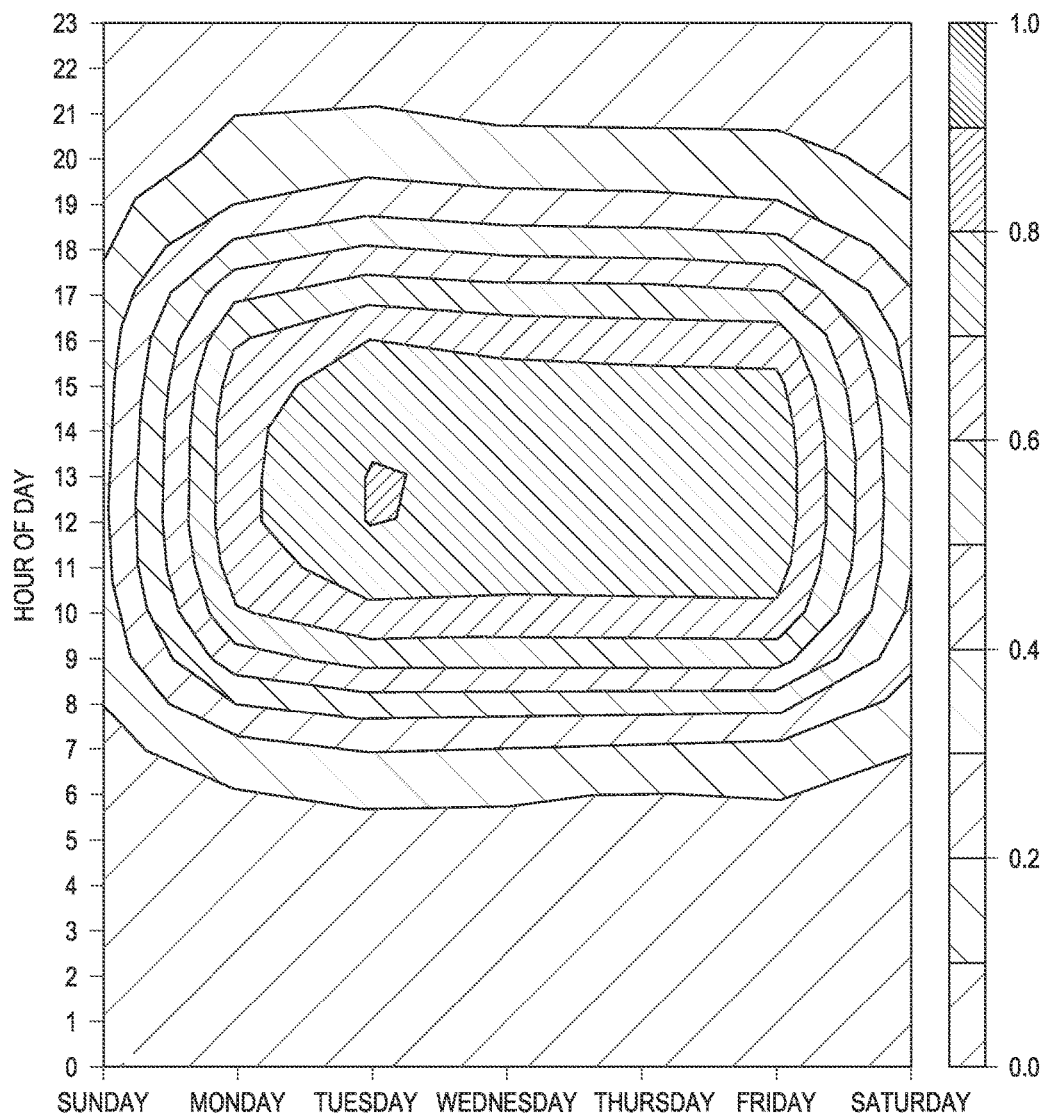
FIG. 4 is a heat map representation of an estimated probability of one or more users accessing the network using a specific network identifier.

FIG. 4 is a heat map representation of an estimated probability of a user or cluster of users accessing the network using a specific network identifier, each user associated with at least one network identifier. The cross hatching representing values closest to zero represent time periods in which it is least likely that the user will access the network service using the network identifier and, as the cross hatching density increases, representing values closer to one, the likelihood increases. For example, referring to FIG. 3, the user is likely to access the network service using the third IP address (represented by the thick solid line circle) on weekdays between 8am and 6 pm. The user's access pattern using the third IP address corresponds to the heat map shown in FIG. 4, with the cross hatching of greatest density appearing on weekdays between 8am and 6 pm and the cross hatching density decreasing outside of those periods of time. If a clustering algorithm is applied to a plurality of user network identifiers, the heat map shown in FIG. 4 would represent an center, average, or aggregate all of the users/network identifiers in a particular cluster.

Referring back to FIG. 1, at block 125, the system determines whether the user (or cluster) access corresponds to accessing the network service from home, from work, from another location, or from various locations while moving (e.g., driving and using a mobile device) or within a particular context (e.g., during a commute between work and home). In one embodiment, the determination of location is performed without user interaction. Alternatively, the determination is made manually by a user's observation of one or more access patterns.

In one embodiment, the access pattern, e.g., illustrated in FIG. 3 and/or FIG. 4, is inspected to estimate the location of the user. For example, the third IP address, represented by the thick solid line circle in FIG. 3, and corresponding heat map in FIG. 4, accesses the network on weekdays between 8 am and 6 pm. This access pattern corresponds to typical work hours and, therefore, leads to a determination that the third IP address (and similar network identifiers if a part of a cluster) represents accessing the network service from work.

The second and fourth IP addresses, represented by the thin solid line circle and filled circle, respectively, correspond to after work and weekend usage, which may be associated with the user accessing the network service from home. This usage may be further analyzed to differentiate between mobile access and "desktop" access. For example, mobile access prior to and following work, or between estimated home and work access, may correspond to the user's commute. An additional example includes estimating mobile access on Friday and Saturday evenings as being within a social context. In one embodiment, only the desktop access is determined to be access from home.

In one embodiment, inspection of the access patterns includes comparing the likelihood of each network identifier accessing the network service with a regular pattern of hours typically associated with a work week. For example, a pattern of access from an IP address during approximately eight hour periods of time, five days of week, is likely to correspond to a user accessing the network service while at a full time job. The likelihood that the access is from work increases when such pattern also includes little to no access from the user using the network identifier outside of the hours of a full time job. The likelihood that the access is from work decreases when such pattern also includes access from the user using the same network identifier outside of the hours of the full time job. In one embodiment, the inspection further includes determining whether the pattern corresponds to typical business hours (8 am-5 pm), within a threshold of one or more hours at the beginning and/or end of said business hours.

In one embodiment, inspection of the access patterns includes comparing the likelihood of each network identifier accessing the network service with a regular pattern of hours typically associated with being outside of business hours. For example, access patterns that fall outside of typical business hours are labeled as being from home.

In one embodiment, mobile access during the above-described access patterns decreases the confidence in the estimation of whether the user is at home or at work.

Additionally, the system optionally uses the connection speed associated with a network identifier to determine if the user is accessing the network service from home or from work. The faster the connection speed, the higher the likelihood that the user is at work, and the slower the connection speed, the higher the likelihood that the user is at home. The system additionally may use a browser/software identifier to determine if the user is accessing the network service from at home or from at work. For example, an identifier for software associated with a television or gaming console is more likely to indicate access from home. Furthermore, the system optionally uses the user's connections within a social networking system to determine if the user is accessing the network service from at home or from at work. For example, if the user indicates a connection is a family member and both the user and family member access the network service using the same network identifier, it is more likely that the user is accessing the network service from home. In one embodiment, the system uses one or more of connection speed, a software identifier, or connection relationship as an additional factor to the inspection of periods of time described above.

Referring again to FIG. 1, at block 130, the system optionally modifies the network service in response to determining whether a user (or cluster of users) is accessing the network service from home or work. For example, the network service is able to optimize targeted advertising, bandwidth allocation, download quality, request priority, or otherwise optimize application software to provide a modified user experience. In one embodiment, the system stores an association between a network identifier and the designation of home or work for the user and modifies the network service in response to determining that the user is accessing the network service using a network identifier with such a stored designation.

Figure 5:
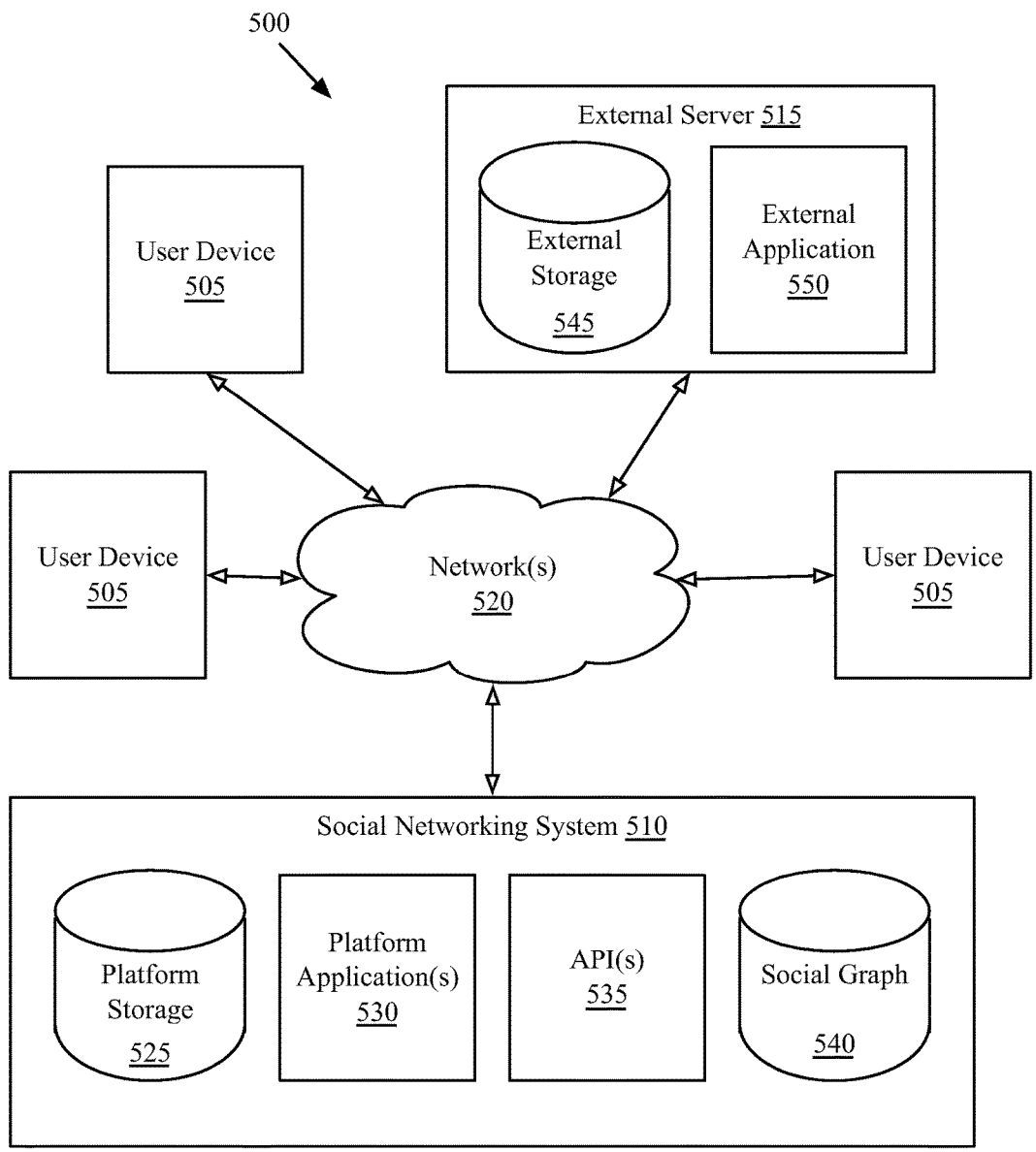
FIG. 5 illustrates, in block diagram form, an exemplary social network.

FIG. 5 illustrates, in block diagram form, an exemplary social network 500. The exemplary social network 500 includes user devices 505, a social networking system 510, and an external server 515 coupled to one or more networks 520. A user interacts with the social networking system 510 using a user device 505, such as a personal computer or a mobile phone. For example, the user device 505 communicates with the social networking system 510 via an application such as a web browser or native application. Typical interactions between the user device 505 and the social networking system 510 include operations such as viewing profiles of other users of the social networking system 510, contributing and interacting with media items, joining groups, listing and confirming attendance at events, checking in at locations, liking certain pages/posts, creating pages, and performing other tasks that facilitate social interaction. Each of these interactions is an exemplary interaction of a user accessing the social networking system as a network service.

The social networking system 510 includes platform storage 525, one or more platform applications 530, one or more application programming interfaces (API's) 535, and a social graph 540. Platform storage 525 stores user preferences/settings, profile data, etc. Exemplary platform applications 530 include the platform for social interactions (e.g., publishing posts, pictures, etc.) as well as social games, messaging services, and any other application that uses the social platform provided by the social networking system 510. In one embodiment, the method 100 described above is performed by a platform application 530 and the corresponding access data is stored in platform storage 525.

One or more API's 535 enable external applications 550 to work with the social networking system 510. For example, an external application 550 utilizes an API 535 to authenticate a user based upon the user's social networking log in username and password. Additionally, an external application 550 utilizes one or more API's 535 to run the application within the platform application 530, to publish a post to the platform application, to access the user's social network connections, etc. In one embodiment, the method 100 described above is performed by an external application 550 and the corresponding access data is stored in external storage 545 or in platform storage 525.

As described above, the method 100 optionally uses a user's connections in the estimation of the user's location. The social graph 540 stores the connections that each user has with other users/entities of the social networking system 510. In one embodiment, the social graph 540 stores second-order connections. The connections may thus be direct or indirect. For example, if user A is a first-order connection of user B but not of user C, and B is a first-order connection of C, then C is a second-order, or indirect, connection of A on the social graph 540. In addition to the order of connectedness, the social graph 540 also includes data describing the nature of the connection. For example, if user A is married to user B, the social graph 540 stores data indicating said relationship.

The external server 515 includes external storage 545 and an external application 550. The external storage 545 stores authentication data, user preferences, etc. As described above, the external application 550 interacts with the social networking system 510 via an API 535. The external application 550 can perform various operations supported by the API 535, such as enabling users to send each other messages through the social networking system 510.

Figure 6:
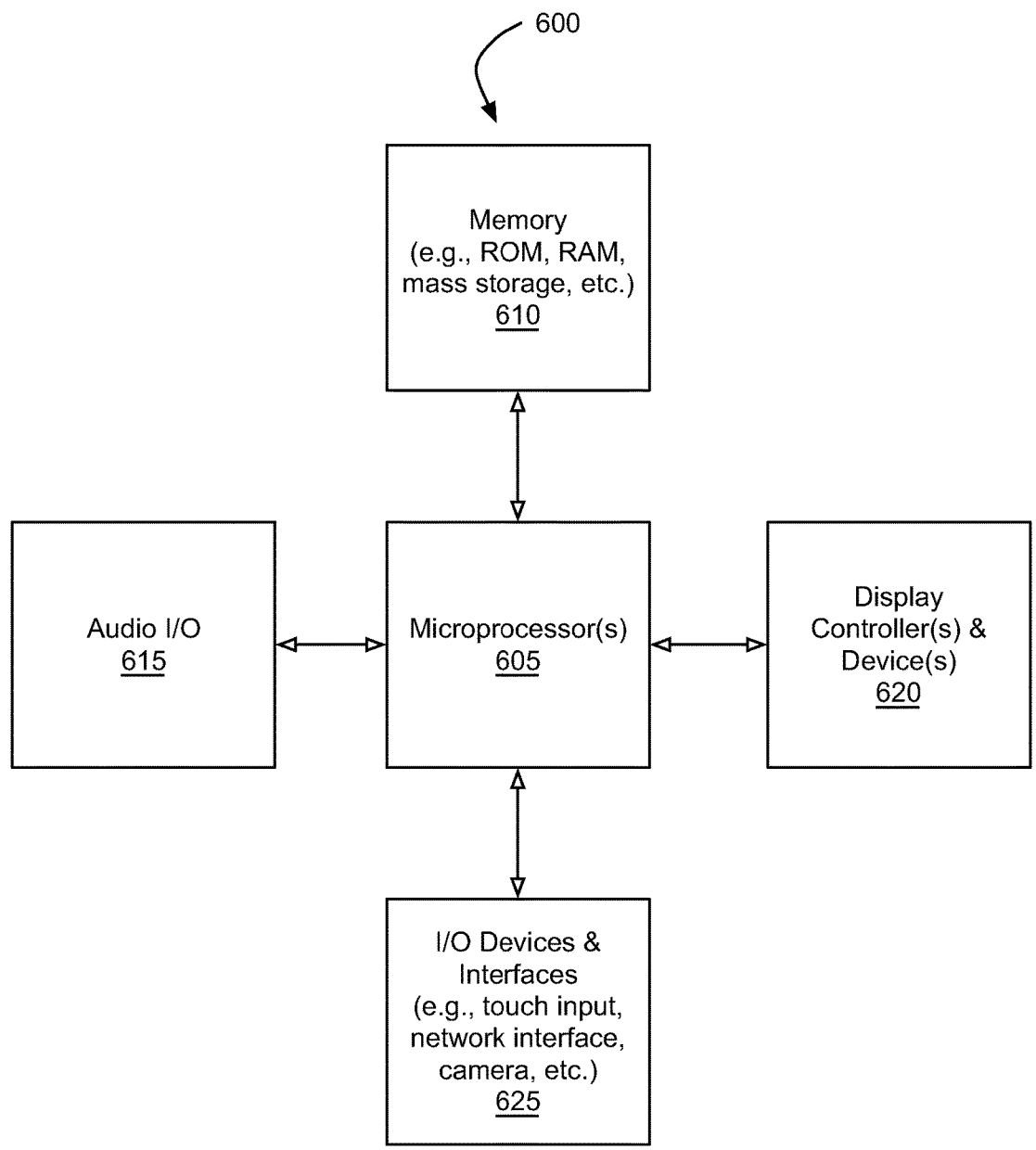
FIG. 6 illustrates, in block diagram form, an exemplary processing system to determine whether a user or cluster of users is accessing a social network from home or from work.

FIG. 6 illustrates, in block diagram form, an exemplary processing system 600 to determine whether a user or cluster of users is accessing a social network from home or from using a given network identifier. Data processing system 600 includes one or more microprocessors 605 and connected system components (e.g., multiple connected chips). Alternatively, the data processing system 600 is a system on a chip.

The data processing system 600 includes memory 610, which is coupled to the microprocessor(s) 605. The memory 610 may be used for storing data, metadata, and programs for execution by the microprocessor(s) 605. The memory 610 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 610 may be internal or distributed memory.

The data processing system 600 also includes an audio input/output subsystem 615 which may include a microphone and/or a speaker for, for example, playing back music or other audio, receiving voice instructions to be executed by the microprocessor(s) 605, playing audio notifications, etc. A display controller and display device 620 provides a visual user interface for the user.

The data processing system 600 also includes one or more input or output ("I/O") devices and interfaces 625, which are provided to allow a user to provide input to, receive output from, and otherwise transfer data to and from the system. These I/O devices 625 may include a mouse, keypad or a keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 600.

The I/O devices and interfaces 625 may also include a connector for a dock or a connector for a USB interface, FireWire, Thunderbolt, Ethernet, etc. to connect the system 600 with another device, external component, or a network. Exemplary I/O devices and interfaces 625 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect the data processing system 600 with another device, external component, or a network and receive stored instructions, data, tokens, etc.

It will be appreciated that one or more buses, may be used to interconnect the various components shown in FIG. 6.

The data processing system 600 is an exemplary representation of one or more of the user's device 505, at least a portion of the social networking system 510, or the external server 515. The data processing system 600 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, the data processing system 600 may be a network computer, server, or an embedded processing device within another device or consumer electronic product. As used herein, the terms computer, system, device, processing device, and "apparatus comprising a processing device" may be used interchangeably with the data processing system 600 and include the above-listed exemplary embodiments.

It will be appreciated that additional components, not shown, may also be part of the system 600, and, in certain embodiments, fewer components than that shown in FIG. 6 may also be used in a data processing system 600. It will be apparent from this description that aspects of the inventions may be embodied, at least in part, in software. That is, the computer-implemented method 100 may be carried out in a computer system or other data processing system 510/515/600 in response to its processor or processing system 605 executing sequences of instructions contained in a memory, such as memory 610 or other non-transitory machine-readable storage medium. The software may further be transmitted or received over a network (not shown) via a network interface device 625. In various embodiments, hardwired circuitry may be used in combination with the software instructions to implement the present embodiments. Thus, the techniques are not limited to any specific combination of hardware circuitry and software, or to any particular source for the instructions executed by the data processing system 600.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:
   detecting a plurality of instances of a user associated with an end user device accessing a network service;
   storing a first identifier for the end user device when the user associated with the end user device is detected to be accessing the network service;
   storing a time for each instance at which the end user device is determined to be accessing the network service;
   storing a second identifier for the end user device when the user associated with the end user device is determined not to be accessing the network service;
   storing a time for each instance at which the end user device is determined not to be accessing the network service;
   applying a clustering algorithm to the stored times for a plurality of sets of data for a plurality of end user devices to generate a cluster of users, the cluster of users having similar patterns of times for accessing the network service and not accessing the network service, each user in the cluster of users associated with a different user identifier, each set of data including a network identifier and associated user and at least one set including the stored first identifier and corresponding instances of time at which the end user device is detected accessing the network service and the stored second identifier and corresponding instances of time at which the end user device is determined not to be accessing the network service;
   determining periods of time during each day of the week in which the cluster of users is likely to be accessing and not accessing the network service based upon the stored identifiers and times;
   determining connection relationships of the cluster of users stored within a communication system;
   determining whether the cluster of users is likely to access the network service while at work or at home based upon the determined periods of time in which the cluster of users is likely to be accessing and not accessing the network service and based on network service access patterns of the determined connection relationships of the cluster of users, one of at work or at home indicated as a location of accessing the network service based on a first user having a first type of connection relationship with the user and the first user having a same network identifier as the user; and
   selecting an advertisement to be displayed to the user based upon the user being included within the cluster and the determination of whether the cluster of users is likely to access the network service while at work or at home.

2. The computer-implemented method of claim 1, wherein the determination of whether the cluster of users is likely to access the network service while at work comprises:
   determining that the user is likely to access the network service using the first identifier during periods of time within business hours and not during periods of time outside of business hours.

3. The computer-implemented method of claim 1, wherein the determination of whether the cluster of users is likely to access the network service while at home comprises:
   determining that the user is likely to access the network service using the first identifier during periods of time outside of business hours.

4. The computer-implemented method of claim 1, further comprising:
   categorizing the first identifier as being associated with a desktop device or a mobile device.

5. The computer-implemented method of claim 1, further comprising:
   selecting a class of service for the user based upon the determination of whether the cluster of users is likely to access the network service while at work or at home.

6. A non-transitory computer-readable medium storing instructions, which when executed by a processing device, cause the processing device to perform a method comprising:
   detecting a plurality of instances of a user associated with an end user device accessing a network service;
   storing a first identifier for the end user device when the user associated with the end user device is detected to be accessing the network service;
   storing a time for each instance at which the end user device is determined to be accessing the network service;
   storing a second identifier for the end user device when the user associated with the end user device is determined not to be accessing the network service;
   storing a time for each instance at which the end user device is determined not to be accessing the network service;
   applying a clustering algorithm to the stored times for a plurality of sets of data for a plurality of end user devices to generate a cluster of users, the cluster of users having similar patterns of times for accessing the network service and not accessing the network service, each user in the cluster of users associated with a different user identifier, each set of data including a network identifier and associated user and at least one set including the stored first identifier and corresponding instances of time at which the end user device is detected accessing the network service and the stored second identifier and corresponding instances of time at which the end user device is determined not to be accessing the network service;
   determining periods of time during each day of the week in which the cluster of users is likely to be accessing and not accessing the network service based upon the stored identifiers and times;
   determining connection relationships of the cluster of users stored within a communication system;
   determining whether the cluster of users is likely to access the network service while at work or at home based upon the determined periods of time in which the cluster of users is likely to be accessing and not accessing the network service and based on network service access patterns of the determined connection relationships of the cluster of users, one of at work or at home indicated as a location of accessing the network service based on a first user having a first type of connection relationship with the user and the first user having a same network identifier as the user; and selecting an advertisement to be displayed to the user based upon the user being included within the cluster and the determination of whether the cluster of users is likely to access the network service while at work or at home.

7. The non-transitory computer-readable medium of claim 6, wherein the determination of whether the cluster of users is likely to access the network service while at work comprises:
determining that the user is likely to access the network service using the first identifier during periods of time within business hours and not during periods of time outside of business hours.

8. The non-transitory computer-readable medium of claim 6, wherein the determination of whether the cluster of users is likely to access the network service while at home comprises:
determining that the user is likely to access the network service using the first identifier during periods of time outside of business hours.

9. The non-transitory computer-readable medium of claim 6, the method further comprising:
categorizing the first identifier as being associated with a desktop device or a mobile device.

10. The non-transitory computer-readable medium of claim 6, the method further comprising:
selecting a class of service for the user based upon the determination of whether the cluster of users is likely to access the network service while at work or at home.

11. An apparatus comprising:
a processing device, wherein the processing device executes instructions that cause the apparatus to:
detect a plurality of instances of a user associated with an end user device accessing a network service;
store a first identifier for the end user device when the user associated with the end user device is detected to be accessing the network service;
store a time for each instance at which the end user device is determined to be accessing the network service;
store a second identifier for the end user device when the user associated with the end user device is determined not to be accessing the network service;
store a time for each instance at which the end user device is determined not to be accessing the network service;
apply a clustering algorithm to the stored times for a plurality of sets of data for a plurality of end user devices to generate a cluster of users, the cluster of users having similar patterns of times for accessing the network service and not accessing the network service, each user in the cluster of users associated with a different user identifier, each set of data including a network identifier and associated user and at least one set including the stored first identifier and corresponding instances of time at which the end user device is detected accessing the network service and the stored second identifier and corresponding instances of time at which the end user device is determined not to be accessing the network service;
determine periods of time during each day of the week in which the user is likely to be accessing and not accessing the network service based upon the stored identifiers and times;
determine connection relationships of the cluster of users stored within a communication system;
determine whether the cluster of users is likely to access the network service while at work or at home based upon the determined periods of time in which the cluster of users is likely to be accessing and not accessing the network service and based on network service access patterns of the determined connection relationships of the cluster of users, one of at work or at home indicated as a location of accessing the network service based on a first user having a first type of connection relationship with the user and the first user having a same network identifier as the user; and
select an advertisement to be displayed to the user based upon the user being included within the cluster and the determination of whether the cluster of users is likely to access the network service while at work or at home.

12. The apparatus of claim 11, wherein the determination of whether the cluster of users is likely to access the network service while at work comprises:
determining that the user is likely to access the network service using the first identifier during periods of time within business hours and not during periods of time outside of business hours.

13. The apparatus of claim 11, wherein the determination of whether the cluster of users is likely to access the network service while at home comprises:
determining that the user is likely to access the network service using the first identifier during periods of time outside of business hours.

14. The apparatus of claim 11, wherein the processing device executes instructions that cause the apparatus to categorize the first identifier as being associated with a desktop device or a mobile device.

15. The apparatus of claim 11, wherein the processing device executes instructions that cause the apparatus to select a class of service for the user based upon the determination of whether the cluster of users is likely to access the network service while at work or at home.

* * * * *